(12) United States Patent
Beck

(10) Patent No.: US 10,644,990 B2
(45) Date of Patent: May 5, 2020

(54) BORDER GATEWAY PROTOCOL (BGP) SECURITY MEASURES ALONG AUTONOMOUS SYSTEM (AS) PATHS

(71) Applicant: Charter Communications Operating, LLC, St. Louis, MO (US)

(72) Inventor: Jody Lee Beck, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 15/990,861

(22) Filed: May 29, 2018

(65) Prior Publication Data

US 2019/0372886 A1 Dec. 5, 2019

(51) Int. Cl.
*H04L 12/707* (2013.01)
*H04L 12/733* (2013.01)
*H04L 29/06* (2006.01)
*H04L 12/721* (2013.01)

(52) U.S. Cl.
CPC ............ *H04L 45/22* (2013.01); *H04L 45/123* (2013.01); *H04L 45/124* (2013.01); *H04L 45/20* (2013.01); *H04L 63/20* (2013.01)

(58) Field of Classification Search
CPC ....... H04L 45/12; H04L 45/121; H04L 47/10; H04L 45/22; H04L 45/123; H04L 63/20; H04L 45/20; H04L 45/124; H04W 40/02
See application file for complete search history.

(56) References Cited

U.S. PATENT DOCUMENTS

| | | | | |
|---|---|---|---|---|
| 2006/0268682 | A1* | 11/2006 | Vasseur | H04L 41/12 370/216 |
| 2015/0146720 | A1* | 5/2015 | Subramanian | H04L 45/121 370/390 |
| 2015/0350060 | A1* | 12/2015 | Patil | H04L 45/22 370/238 |
| 2015/0365271 | A1* | 12/2015 | Chunduri | H04L 45/741 370/216 |
| 2018/0324082 | A1* | 11/2018 | Hao | H04L 45/123 |

* cited by examiner

*Primary Examiner* — Dady Chery
(74) *Attorney, Agent, or Firm* — The Marbury Law Group, PLLC

(57) ABSTRACT

Systems, methods, and devices of the various embodiments disclosed herein may provide Border Gateway Protocol (BGP) security measures along autonomous system (AS) paths. Various embodiments may provide transparency as to the local security measures implemented along an AS path. Various embodiments may enable routing along secure paths. Various embodiments may enable the selection of AS paths based on a comparison of the security implemented along the AS paths. Various embodiments may reduce the impact of BGP attacks.

24 Claims, 13 Drawing Sheets

Modified Path Length

Path A
AS2 + ASN1 = 2
+
RPKI (.5) + None (1) = 1.5
→ 3.5

Path B
ASN4 + ASN1 = 2
+
None (1) + None (1) = 2
→ 4

| 502 | 503 |
|---|---|
| Prefix Filtering | -0.5 |
| RPKI or BGPsec | -0.5 |
| Community | -0.25 |
| AS-Path | -0.25 |
| None or Unknown | -0 |

| 0 | 0 | 1 | 1 | 1 | 1 | 1 | 0 |
|---|---|---|---|---|---|---|---|
| 601 | 602 | 603 | 604 | 605 | 606 | 607 | 608 |

FIG. 6

BORDER GATEWAY PROTOCOL (BGP) SECURITY MEASURES ALONG AUTONOMOUS SYSTEM (AS) PATHS

BACKGROUND

Internet Service Providers (ISPs) and other types of Internet connected networks continually face the threat of Border Gateway Protocol (BGP) attacks. In a BGP attack, a malicious attacker causes Internet traffic to be misrouted and/or mishandled by manipulating BGP routing data. The misrouting and/or mishandling of Internet traffic due to BGP hijacks represents a significant security threat to ISPs and other Internet connected networks, as well as Internet users, as traffic can be forwarded through malicious computing devices and is often not forwarded to its intended destination at all.

SUMMARY

The systems, methods, and devices of the various embodiments disclosed herein may provide Border Gateway Protocol (BGP) security measures along autonomous system (AS) paths. Various embodiments may provide transparency as to the local security measures implemented along an AS path. Various embodiments may enable routing along secure paths. Various embodiments may enable the selection of AS paths based on a comparison of the security implemented along the AS paths. Various embodiments may reduce the impact of BGP attacks.

Various embodiments may provide a method of selecting a secure BGP path performed by a processor of a computing device, such as a router. The method may include receiving a packet for routing to a route prefix, determining any available paths to the route prefix, determining a security cost for each available path based at least in part on any path security attributes associated with that respective available path, modifying a path length for the available paths according to their respective security costs, selecting a path for routing the packet from the available paths based at least in part on the modified path lengths, and routing the packet to the route prefix along the selected path. In various embodiments, modifying the path length for the available paths according to their respective security costs may include adding the security cost to a hop count for each respective available path. In various embodiments, the security costs may be values determined by applying one or more security discount associated with one or more types of security. In various embodiments, the path security attributes may be attributes indicated in BGP update messages received for the available paths. In various embodiments, the path security attributes may indicate one or more types of security applied by autonomous systems in the available paths. In various embodiments, selecting the path for routing the packet from the available paths based at least in part on the modified path lengths may include using the path security attributes as a tie breaker between paths having matching modified path lengths.

Various embodiments may provide a method for advertising a secure BGP path performed by a processor of a computing device, such as a router. The method may include receiving an indication of a route prefix to advertise, determining one or more current security settings, generating a BGP message including indications of any current security settings as one or more path security attributes, and sending the BGP message including the one or more path security attributes. In various embodiments, the one or more path security attributes may indicate one or more types of security applied by the computing device. In various embodiments, the one or more path security attributes may be indicated as bit values in the BGP message. In various embodiments, the one or more path security attributes are indicated as transitive attributes in the BGP message.

Further embodiments disclosed herein include a computing device having a processor configured with processor-executable instructions to perform operations of the methods summarized above. Further embodiments disclosed herein include a computing device including means for performing functions of the methods summarized above. Further embodiments disclosed herein include a non-transitory processor-readable storage medium having stored thereon processor-executable instructions configured to cause a computing device processor to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

FIG. 4B is a block diagram comparing modified path lengths between paths of the IP network of FIG. 4A.

FIG. 5 is a block diagram of an example security cost table according to an embodiment.

FIG. 6 is a block diagram of an example path security attribute according to an embodiment.

DETAILED DESCRIPTION

Figure 1:
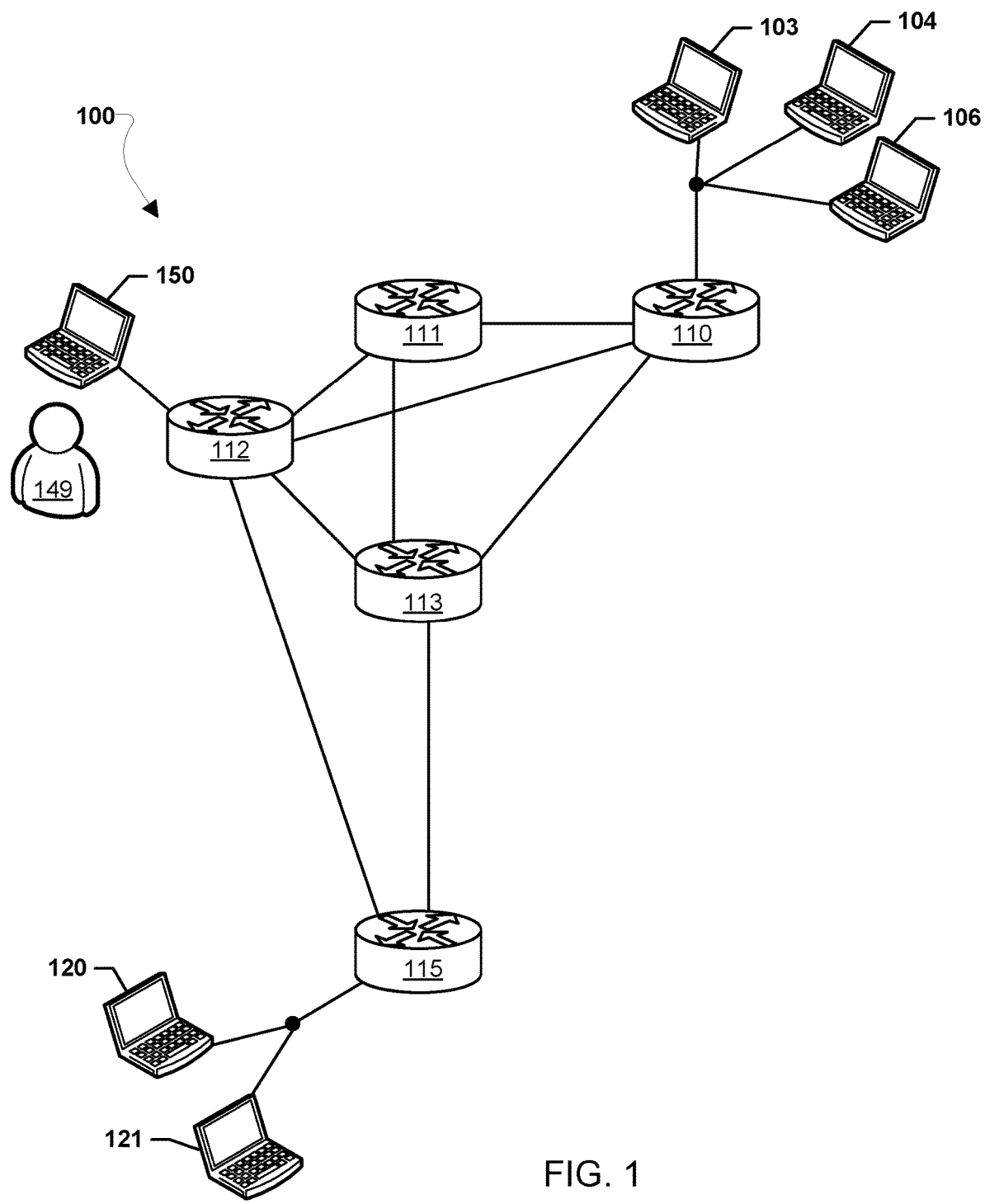
FIG. 1 is a communication system block diagram of an Internet Protocol (IP) network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "computing device" is used interchangeably herein to refer to any one or all of satellite or cable set top boxes, laptop computers, rack mounted computers, routers, switch, cable modem termination systems (CMTSs), cellular telephones, smart phones, personal or mobile multi-media players, personal data assistants (PDAs), personal computers, tablet computers, smart books, palm-top computers, desk-top computers, wireless electronic mail receivers, multimedia Internet enabled cellular telephones, wireless gaming controllers, streaming media players (such as, ROKU™, AppleTV™), smart televisions, digital video recorders (DVRs), modems, and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

The various embodiments are described herein using the term "router" to refer to any computing device capable of functioning as a router, such as an edge router, a core router, a boundary router, or any other type of router. A router may be any computing device that may be configured to forward data, such as Internet Protocol (IP) packets, from one computing device to another computing device. A router may be a dedicated computing device or a computing device including a router module (e.g., running an application which may cause the computing device to operate as a router).

According to Border Gateway Protocol (BGP), an Autonomous Systems (AS), such as an Internet Service Provider (ISP), that is assigned a range of Internet Protocol (IP) addresses, i.e., a netblock, may advertise or announce that the netblock is reachable by announcing a route to the AS with a route prefix for the netblock in a BGP update. A route prefix may indicate a netblock's IP address prefix and a length of the IP address prefix as a number of bits. For example, an AS assigned the netblock "24.158.32.0" may cause traffic to be routed to it by sending a BGP update from its routers (e.g., peer routers, edge routers, etc.) announcing a route with the route prefix "24.158.32.0/19". The route prefix "24.158.32.0/19" indicates the IP address prefix of the netblock of the AS "24.158.32.0" and that the AS's IP address prefixes are 19 bits long.

In BGP, the number of ASs through which a packet must travel along a path to reach the AS the packet is addressed to may be that path's path length. The path length may refer to a number of hops through which the packet may travel to reach the AS to which the packet is addressed, with each hop representing a unique AS number (ASN) the packet is routed through along the path. BGP path lengths may be determined in BGP by counting the number of unique ASNs in a BGP update advertising a path. As BGP messages that advertise paths are received by routers, the paths and their attributes may be stored in routing tables for use in routing packets along those paths. In response to receiving a packet addressed to a route prefix, a router may determine the available paths to the route prefix stored in its routing table. The router may determine the path lengths for each available path and may select the route with the lowest path length as the path to use for routing the packet. When the router identifies a tie between lowest path lengths, additional criteria beyond path length may be used to break the tie and select the path to use for routing the packet.

In a BGP attack, a malicious attacker may cause Internet traffic to be misrouted by announcing a malicious path for a route prefix the malicious attacker is not actually assigned. For example, an AS may normally announce a routing prefix of "10.0.0.0/24" indicating that AS is the origin for that routing prefix (i.e., the origin AS). The malicious attacker may announce a malicious path with the routing prefix "10.0.0.0/24" as well, thereby falsely advertising itself as the origin of that routing prefix (i.e., the bad AS). The announcement of the malicious route may be propagated from router to router according to BGP and the malicious route may be used to route Internet traffic when the path length for the malicious route to a bad AS is shorter than the path length for the good route to the origin AS. In this manner, the malicious attacker may hijack packets with the routing prefix "10.0.0.0/24" because the malicious route will be used for routing Internet traffic.

Some ASs, such as ISPs and other Internet connected networks, attempt to stop BGP attacks by deploying conventional local security measures that provide of limited efficacy. Example conventional local security measures may include but are not limited to using prefix tagging, applying local preference settings, setting maximum prefix limits, prefix filtering using the Routing Assets Database (RADb), certifying resources using the Resource Public Key Infrastructure (RPKI), and implementing the BGPsec protocol (BGPsec). Such conventional local security measures have not been adopted across all networks connected to the Internet, further limiting the protection afforded by such conventional local security measures. Due to their limited adoption, conventional local security measures have not effectively reduced the threat of BGP attacks, and the misrouting and/or mishandling of Internet traffic due to BGP hijacks continues to represents a significant security threat to ISPs and other Internet connected networks, as well as Internet users, despite the presence of conventional local security measures The systems, methods, and devices of the various embodiments may provide BGP security measures along AS paths. Various embodiments may enable secure BGP paths to be advertised by a computing device of an AS, such as a router (e.g., peer router, edge router, etc.). In various embodiments, a computing device, such as a router, may receive an indication of a route prefix to advertise. As one example, the indication of a route prefix to advertise may be a BGP update message received from another router. As another example, the indication of a route prefix to advertise may be an indication that the computing device itself is the origin for the route prefix. In various embodiments, the computing device may determine one or more current security settings. The one or more current security settings may be local security measures applied by the computing device to packets routed by the AS of the computing device. Current security settings may include using prefix tagging, applying local preference settings, setting maximum prefix limits, prefix filtering using RADb, certifying resources using RPKI, implementing BGPsec, or any other local security measure currently being applied by the AS of the computing device. In various embodiments, the computing device may generate a BGP message, such as a BGP update message, indicating the current security settings as one or more path security attributes. In various embodiments, the one or more path security attributes may indicate one or more types of security applied by the AS of the computing device, such as one more types of security applied by the computing device. In various embodiments, the one or more path security attributes may be indicated as bit values in the BGP message. For example, each bit value in a string of bit values may represent whether or not a type of security was applied. The indication of the one or more types of security applied in the BGP message may provide transparency as to the local security measures implemented along an AS path. In various embodiments, the one or more path security attributes may be indicated as transitive attributes in the BGP message. For example, a transitive flag may be set for the one or more path security attributes in the BGP message. In this manner, though an AS may not be configured to handle the one or more path security attributes, when the AS advertises the route based on the BGP message, the one or more path security attributes may be preserved.

Various embodiments may enable routing along secure paths. In various embodiments, computing device of an AS, such as a router (e.g., peer router, edge router, etc.), may receive a BGP message including one or more path security attributes. In various embodiments, the computing device may store the path security attributes for a route prefix associated with the BGP message. For example, the computing device may update a routing table to include the path security attributes. In various embodiments, in response to storing the path security attributes, the computing device may append its own routing information, such as its respective ASN and its own one or more path security attributes to the routing information in the BGP message and advertise the path to the route prefix via a new BGP message. In various embodiments, the one or more path security attributes may be carried in the BGP message in addition to, and in a similar manner to, AS Path attributes.

Various embodiments may enable the selection of AS paths based on a comparison of the security implemented along the AS paths. Various embodiments may enable the selection of a secure BGP path. In various embodiments, a computing device of an AS, such as a router (e.g., peer router, edge router, etc.), may receive a packet for routing to a route prefix and determine the available paths to the route prefix. For example, the computing device may compare the route prefix to entries in a routing table to identify the available paths. In various embodiments, the computing device may determine a security cost for each available path based on each path's security attributes. In various embodiments, security costs may be determined by applying security discounts associated with types of security applied by each AS in the available paths. In various embodiments, the computing device may modify a path length for the available paths according to their respective security costs. For example, a determined security cost may be added to the path length for an available path thereby resulting in a modified path length. The computing device may select a path from the available paths based at least in part on the modified path length. In various embodiments, selecting the path may include breaking a tie between paths with matching modified path lengths based at least in part on the path security attributes. For example, a path applying security, or a certain type of security, may be selected over a path not applying security.

Various embodiments may reduce the impact of BGP attacks by increasing the length of a malicious path to a bad AS. Security may not be applied in the malicious path to the bad AS, which may have enabled the BGP attack to be initiated. In various embodiments, based on the security cost of the malicious path being higher as the malicious path may not apply security, the modified path length for the malicious path may be longer than the modified path length for a secure path. In this manner, the secure path may be selected over the malicious path in various embodiments.

Various examples of different protocols are discussed herein, such as BGP. The discussions of specific protocols, such as BGP, are provided merely as examples to better illustrate the aspects of the various embodiments, and are not intended to limit the various embodiments in any way. Other protocols may be used with the various embodiments, and the other protocols may be substituted in the various examples without departing from the spirit or scope of the invention.

FIG. 1 illustrates an IP network 100 suitable for use with various embodiments. The IP network 100 may include multiple devices, such as routers 110, 111, 112, 113, 115, and computing devices 103, 104, 106, 120, 121, 150. While each router 110, 111, 112, 113, 115 is illustrated in FIG. 1 as a single device, each router 110, 111, 112, 113, 115 may be one or more routers of an AS. The routers 110, 111, 112, 113, 115 and computing devices 103, 104, 106, 120, 121, 150 or the network 100 may exchange data with one another according to IP protocols via their various connections with one another. Collectively, the connections between the routers 110, 111, 112, 113, 115 may represent the Internet and the data routed between the routers 110, 111, 112, 113, 115 may be Internet traffic. The routers 110, 111, 112, 113, 115 may exchange routing information with one another according to BGP. Each router 110, 111, 112, 113, 115 may have its own respective ASN assigned to it to distinguish one router from another router.

A router 110 of an AS, such as an ISP, may be connected to various computing devices receiving service from that entity, such as computing devices 103, 104, 106. A router 115 of a different entity, such as a different ISP, may be connected to various computing devices receiving service from that entity, such as computing devices 120, 121. A range of IP addresses, i.e., a netblock, may be assigned to each different entity (e.g., on a per ASN basis), and the respective computing devices of that entity may be assigned IP addresses within that netblock. Each netblock may have a different route prefix. For example, computing devices 103, 104, 106 connected to the router 110 of a first entity may have IP addresses within that first entity's netblock identified by a first route prefix and computing devices 121, 121 connected to router 115 of a second entity may have IP addresses with the second entity's netblock identified by a second route prefix. As the first route prefix of the first netblock may identify that the netblock is associated with the router 110, Internet traffic destined for IP addresses in the first netblock may be routed to router 110 by the other routers 111, 112, 113, 115. Similarly, as the second route prefix of the second netblock may identify that the netblock is associated with the router 115, Internet traffic destined for IP addresses in the second netblock may be routed to router 115 by the other routers 110, 111, 112, 113.

The various routers 110, 111, 112, 113, 115 may exchange BGP messages with one another to create, update, and withdraw routing paths among one another in their respective routing tables. As BGP events occur, BGP log messages, such as BGP messages reflecting BGP updates, BGP withdraws, etc., may be generated and sent from the routers 110, 111, 112, 113, 115.

During normal operation, routing of Internet traffic among the routers 110, 111, 112, 113, 115 may occur according to the BGP routing information advertised by the respective entities operating those routers 110, 111, 112, 113, 115. For example, the entity operating router 110 may be assigned the netblock "24.158.32.0" and may cause traffic to be routed to router 110 by sending a BGP update announcing a route with the route prefix "24.158.32.0/19". Routers 111, 112, 113, and 115 may then update their routing tables to route Internet traffic for the netblock "24.158.32.0" to router 110 according to the BGP update and Internet traffic destined for computing device 103, 104, 106 with IP addresses in the netblock "24.158.32.0" may flow to router 110 for routing to those computing devices.

In a BGP attack, a malicious attacker 149 may use his or her computing device 150 to corrupt an AS, such as router 112, to hijack netblocks that are not assigned to the malicious attacker 149. The computing device 150 of the malicious attacker 149 may cause Internet traffic to be misrouted by announcing a malicious route with the malicious attacker 149 is not actually assigned. Continuing with the preceding example of router 110 being associated with netblock "24.158.32.0", router 110 may normally announce its routes with a routing prefix of "24.158.32.0/19". To hijack Internet traffic intended for the netblock "24.158.32.0" through router 110, the computing device 150 of the malicious attacker 149 may announce a malicious route with the routing prefix "24.158.32.0/19" at router 112. The announcement of the malicious route may be propagated between routers 111, 112, 113, 115 according to BGP and the malicious route may be used to route Internet traffic by any impacted router for which the AS path length to router 112 is shorter than the AS path length to router 110. In this manner, the malicious attacker 149 may hijack a portion of the Internet traffic intended for computing devices 103, 104, and 106. Because the malicious route will be used for routing Internet traffic when the path length is shorter to router 112, rather than the intended route by the entity actually assigned the netblock "24.158.32.0" (i.e., router 110) some packets will be inaccurately routed to the malicious attacker 149. For example, Internet traffic addressed to computing device 103 sent by computing device 120 may be routed from router 115 to router 112 because the path length to router 112 would only be one hop as opposed to two hops to router 110 via necessary router 113.

In various embodiments, the security applied by the routers 110, 111, 112, 113, and 115 along BGP paths between the routers 110, 111, 112, 113, and 115 may be taken into account in the path selection for routing packets to thereby reduce the impact of BGP attacks by increasing the length of a malicious path.

Figure 2:
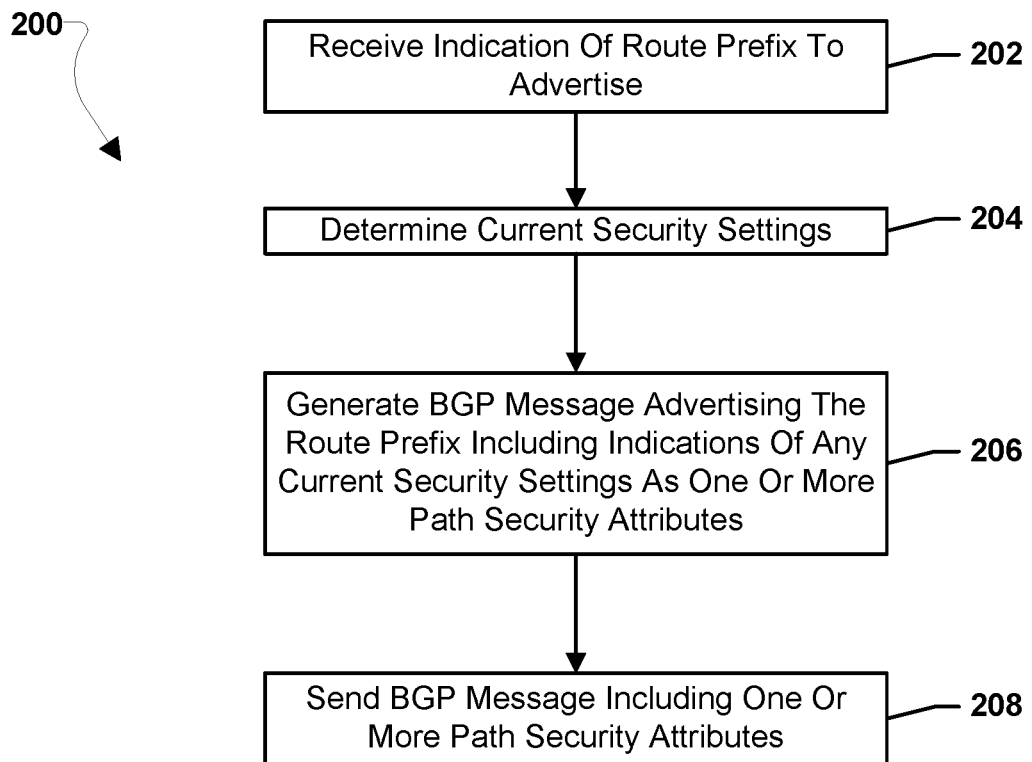
FIG. 2 is a process flow diagram illustrating an embodiment method for advertising a secure Border Gateway Protocol (BGP) path.

FIG. 2 is a process flow diagram illustrating an embodiment method 200 for advertising a secure BGP path. In various embodiments, the operations of method 200 may be performed by a computing device, such as router (e.g., 110, 111, 112, 113, 115), of an AS, such as an ISP.

With reference to FIGS. 1 and 2, in block 202 the computing device may receive an indication of a route prefix to advertise. As one example, the indication of a route prefix to advertise may be a BGP update message received from another router. As another example, the indication of a route prefix to advertise may be an indication that the computing device itself is the origin for the route prefix.

In block 204 the computing device may determine one or more current security settings. The one or more current security settings may be local security measures applied by the computing device to packets routed by the AS of the computing device. Current security settings may include using prefix tagging, applying local preference settings, setting maximum prefix limits, prefix filtering using RADb, certifying resources using RPKI, implementing BGPsec, or any other local security measure currently being applied by the AS of the computing device.

In block 206 the computing device may generate a BGP message advertising the route prefix including indications of any current security settings as one or more path security attributes. In various embodiments, the one or more path security attributes may indicate one or more types of security applied by the AS of the computing device, such as one more types of security applied by the computing device. In various embodiments, the one or more path security attributes may be carried in the BGP message in addition to, and in a similar manner to, AS Path attributes. In various embodiments, the one or more path security attributes may be indicated as bit values in the BGP message. For example, each bit value in a string of bit values may represent whether or not a type of security was applied. The indication of the one or more types of security applied in the BGP message may provide transparency as to the local security measures implemented along an AS path. In various embodiments, the one or more path security attributes may be indicated as transitive attributes in the BGP message. For example, a transitive flag may be set for the one or more path security attributes in the BGP message.

In block 208 the computing device may send the BGP message including one or more path security attributes. For example, the computing device may send the BGP message to all neighboring routers.

Figure 3A:
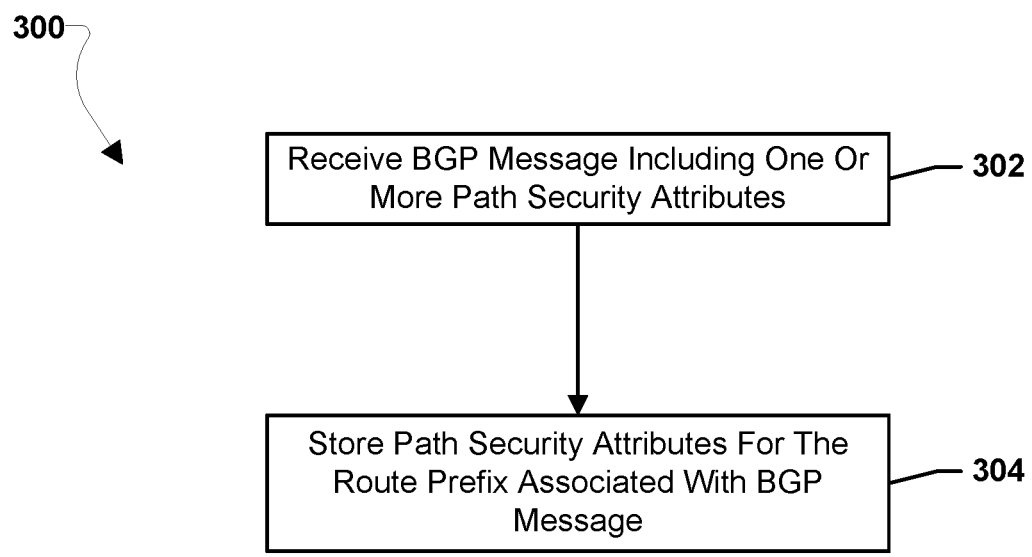
FIG. 3A is a process flow diagram illustrating an embodiment method for storing path security attributes.

FIG. 3A is a process flow diagram illustrating an embodiment method 300 for storing path security attributes. In various embodiments, the operations of method 300 may be performed by a computing device, such as router (e.g., 110, 111, 112, 113, 115), of an AS, such as an ISP. In various embodiments, the operations of method 300 may be performed in conjunction with the operations of method 200 (FIG. 2).

With reference to FIGS. 1-3A, in block 302 the computing device may receive a BGP message including one or more path security attributes. In various embodiments, the one or more path security attributes may be carried in the BGP message in addition to, and in a similar manner to, AS Path attributes.

In block 304 the computing device may store path security attributes for the route prefix associated with the BGP message. For example, the computing device may update a routing table to include the path security attributes. The path security attributes may indicate the security applied by each ASN in the path associated with the BGP message. For example, the path security attributes may indicate whether or not each AS in the path is using prefix tagging, applying local preference settings, setting maximum prefix limits, prefix filtering using RADb, certifying resources using RPKI, implementing BGPsec, or any other local security measure.

In various embodiments, in response to storing the path security attributes, the computing device may append its own routing information, such as its respective ASN and its own one or more path security attributes to the routing information in the BGP message and advertise the path to the route prefix via a new BGP message. For example, in response to storing the path security attributes the computing device may perform operations of method 200 (FIG. 2) to advertising a secure BGP path to the route prefix through the computing device. In various embodiments, the one or more path security attributes may be carried in the BGP message in addition to, and in a similar manner to, AS Path attributes. In various embodiments, the one or more path security attributes may be indicated as transitive attributes in the BGP message.

Figure 3B:
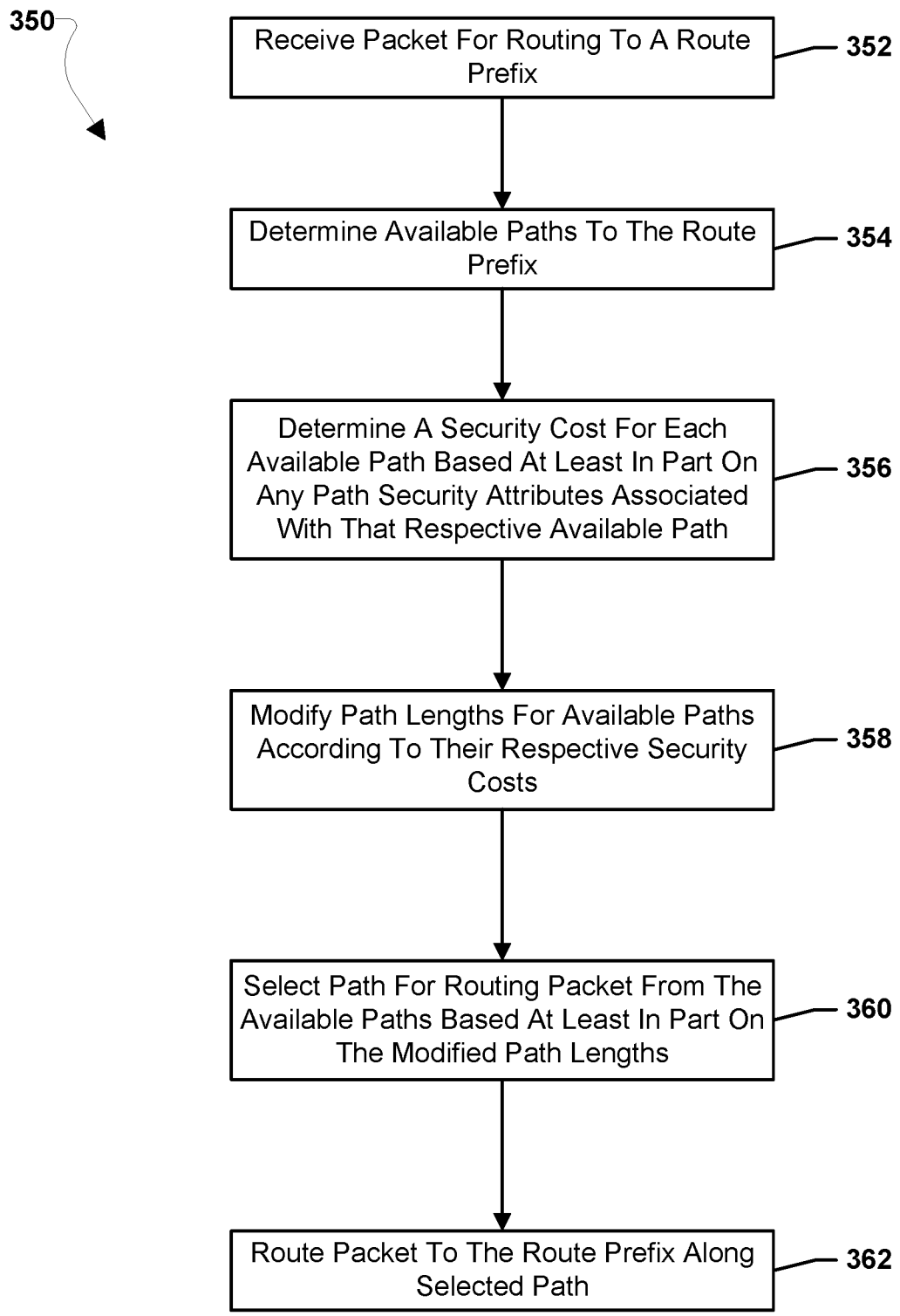
FIG. 3B is a process flow diagram illustrating an embodiment method for selecting a secure BGP path.

FIG. 3B illustrates an embodiment method 350 for selecting a secure BGP path. In various embodiments, the operations of method 350 may be performed by a computing device, such as router (e.g., 110, 111, 112, 113, 115), of an AS, such as an ISP. In various embodiments, the operations of method 350 may be performed in conjunction with the operations of methods 200 (FIG. 2) and/or 300 (FIG. 3A).

With reference to FIGS. 1-3B, in block 352 the computing device may receive a packet for routing to a route prefix. The packet may be a packet received from a computing device connected to the router and may be addressed to an IP address reachable by the route prefix. In block 354 the computing device may determine any available paths to the route prefix. For example, the computing device may compare the route prefix to entries in a routing table to identify the available paths as paths having the same route prefix.

In block 356 the computing device may determine a security cost for each available path based at least in part on any path security attributes associated with that respective available path. In various embodiments, security costs may be determined by applying security discounts associated with types of security applied by each AS in the available paths. In various embodiments, path security attributes may be stored for each path. The path security attributes may indicate the security applied by each ASN in the path from the computing device to the route prefix. For example, the path security attributes may indicate whether or not each AS in the path is using prefix tagging, applying local preference settings, setting maximum prefix limits, prefix filtering using RADb, certifying resources using RPKI, implementing BGPsec, or any other local security measure. Security discounts for types of security may be stored in a memory available to the computing device, such as in a security cost table stored in a memory. For example, a security cost table may correlate security types and security discounts with one another. The computing device may determine match the security types indicated by the path security attributes to the security types in the security cost table and add the security discounts corresponding to the matching security types together. In some embodiments, the total of the security discounts may be added to an integer value and the result may be the security cost for an AS. As an example, security discounts may be negative values and the integer value may be one. An AS without an associated path security attribute, or with a security attribute indicating the security type was unreported, may not receive a security discount or the security discount may be zero. As such, the more security applied the less the security cost may be. Each security cost of each AS in the path may be added together to determine the total security cost for the path.

In block 358 the computing device may modify path lengths for available paths according to their respective security costs. For example, a determined security cost may be added to the path length for an available path thereby resulting in a modified path length.

In block 360 the computing device may select a path for routing the packet from the available paths based at least in part on the modified path lengths. In various embodiments, the computing device may select the path for routing the packet with the lowest modified path length. In various embodiments, selecting the path may include breaking a tie between paths with matching modified path lengths based at least in part on the path security attributes. For example, a path applying security, or a certain type of security, may be selected over a path not applying security.

In block 362 the computing device may route the packet to the route prefix along the selected path.

Figure 4A:
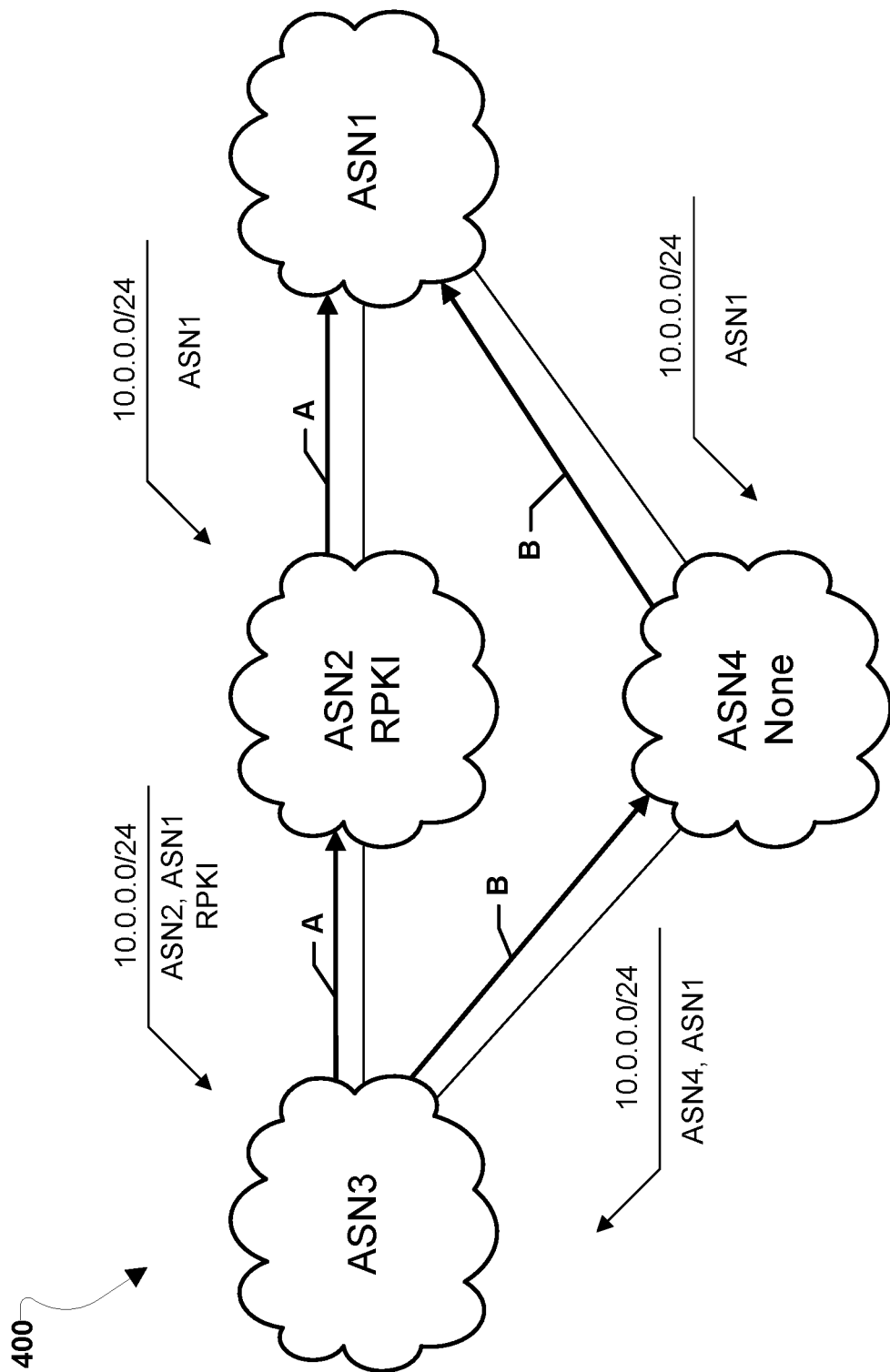
FIG. 4A is a communication system block diagram illustrating selection of a secure BGP path in an IP network according to an embodiment.

FIG. 4A is a communication system block diagram illustrating selection of a secure BGP path A in an IP network 400 according to an embodiment. With reference to FIGS. 1-4A, an AS, such as router ASN1, may advertise a route prefix "10.0.0.0/24" to neighboring ASs, such as routers ASN2 and ASN4, in a BGP message. Router ASN4 may be a conventional router that may not indicate path security attributes. In response to receiving the BGP message from router ASN1, the router ASN4 may send a BGP message advertising the path through router ASN4 to router ASN1 and the router prefix "10.0.0.0/24" to its neighboring router, such as router ASN3. Router ASN2 may be an embodiment router that may indicate path security attributes. Router ASN2, for example, may apply RPKI to packets passing through the router as a security measure. In response to receiving the BGP message from router ASN1, the router ASN2 may send a BGP message advertising the path through router ASN2 to router ASN1 and the router prefix "10.0.0.0/24" to its neighboring router, such as router ASN3 and the BGP message may include a path security attribute indicating router ASN2 applies RPKI.

In an embodiment, router AS3 may be configured to select a secure BGP path for routing packets. For example, in response to receiving a packet for routing to route prefix "10.0.0.0/24", the router AS3 may perform operations of method 350 (FIG. 3A) to select between path A through router AS2 to route the packet and path B through router AS4 to route the packet.

In an embodiment, the router ASN3 may modify the path lengths of the routes A and B based on their respective path security attributes and may select the shortest path based on the modified path lengths. For example, FIG. 4B illustrates modified path lengths between paths of the IP network 400 according to an embodiment. With reference to FIGS. 1-4B, path A may include two hops from router ASN3, i.e., a hop to router ASN2 and a hop to router ASN1. The security along path A may include RPKI applied by router ASN2 which may result in a security cost of 0.5 and no security applied or indicated by router ASN1 which may result in a security cost of 1 for a total security cost along path A of 1.5. The total security cost along path A and the path length for path A may be added together to arrive at the modified path length of 3.5. In a similar manner, path B may include two hops from router ASN3, i.e., a hop to router ASN4 and a hop to router ASN1. The security along path B may include no security applied or indicated by router ASN4 which may result in a security cost of 1 and no security applied or indicated by router ASN1 which may result in a security cost of 1 for a total security cost along path B of 2. The total security cost along path B and the path length for path B may be added together to arrive at the modified path length of 4. As path A's modified path length of 3.5 may be less than path B's modified path length of 4, the router ASN3 may select path A to route the packet through to router ASN1. In this manner, though the actual path lengths for path A and path B are the same, i.e., 2 hops, the more secure path, path A, may be prioritized over the less secure path, path B, in route selections by an embodiment router, such as router ASN3, using the modified path lengths.

FIG. 5 is a block diagram of an example security cost table 500 according to an embodiment. With reference to FIGS. 1-5, the security cost table 500 may include security types 502 correlated with security discounts 503. In some embodiments, the security discounts 503 may be values, such as positive or negative values, associated with different security types 502 or the lack there off. For example, the different security types may be prefix filtering, RPKI or BGPsec, community security, AS-Path security, or none or unknown security. These security types 502 may correspond to path security attributes that may be indicated in embodiment BGP messages associated with a path. In various embodiments, the security discounts 503 may be subtracted from an integer value assigned by default to routes, such as a default security cost, e.g., "1". The security discounts 503 for any path security attributes matching the security types 502 may be subtracted from, or added to, that default security cost to determine the security cost for each AS in the AS path. For example, when the security discounts are negative numbers, the security discounts may be added to the default security cost to reduce the cost based on the security applied by each AS. For example, and the integer value may be one. An AS without an associated path security attribute, or with a security attribute indicating the security type was unreported, may not receive a security discount or the security discount may be zero. As such, the more security applied the less the security cost may be. Each security cost of each AS in the path may be added together to determine the total security cost for the path. For example, an AS applying both prefix filtering and RPKI may have its security cost reduced to zero according to the security cost table 500 (i.e., 1+−0.5+−0.5=0). As another example, an AS applying no security or not reporting its security may have the default security cost of one according to the security cost table 500 (i.e., 1+0=1).

FIG. 6 is a block diagram of an example path security attribute 600 according to an embodiment. With reference to FIGS. 1-6, the path security attribute 600 may be a byte value carried in a BGP message including eight bit positions 601, 602, 603, 604, 605, 606, 607, 608. The values at the bit positions 601, 602, 603, 604, 605, 606, 607, 608 may indicate the types of security applied by an AS associated with the path security attribute 600. For example, each bit value at the bit positions 601, 602, 603, 604, 605, 606, 607, 608 may represent whether or not a type of security was applied. The indication of the one or more types of security applied in the BGP message may provide transparency as to the local security measures implemented along an AS path. As a specific example, bit positions 601 and 602 may be reserved, bit position 603 may indicate whether or not AS-path security is applied but the AS, bit position 604 may indicate whether or not BGPsec is applied by the AS, bit position 605 may indicate whether or not RPKI is applied by the AS, bit position 606 may indicate whether or not community security is applied by the AS, bit position 607 may indicate whether or not prefix filtering is applied by the AS, and bit position 608 may indicate whether or not security is not applied or is not reported by the AS. The example bit values of "00111110" in FIG. 6 may indicate the AS associated with path security attribute 600 applies AS-path security, BGPsec, RPKI, community security, and prefix filtering. As an alternative, a path security attribute for an AS that does not report its security may be "00000001".

Figure 7:
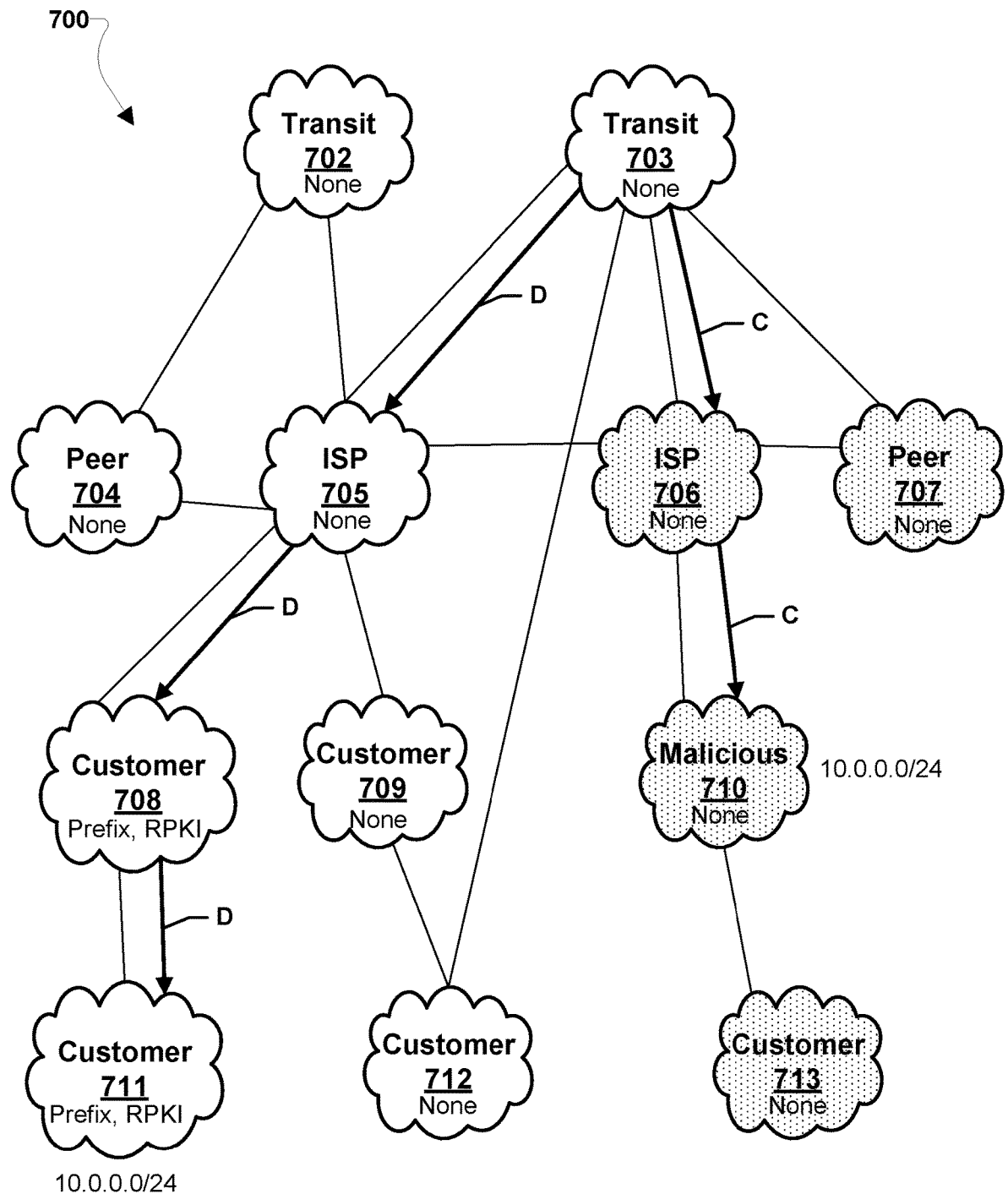
FIG. 7 is a communication system block diagram illustrating selection of a secure BGP path in an IP network according to an embodiment.

FIG. 7 is a communication system block diagram illustrating selection of a secure BGP path, path D, in an IP network 700 according to an embodiment. With reference to FIGS. 1-7, the IP network 700 may include different ASs, such as transit routers 702, 703, peer router 704, ISP router 705, ISP router 706, peer router 707, customer routers 708, 709, 711, 712, and malicious router 710. In the network 700, only customer routers 708 and 711 may apply security while the other routers, 702, 703, 704, 705, 706, 707, 709, 710, 712, and 713 may not apply security. Specifically, customer routers 708 and 711 may apply prefix filtering and RPKI to packets routed through the customer routers 708 and 711. In various embodiments, customer routers 708 and 711 may be configured to report their security setting using path security attributes in BGP messages, for example by performing operations of methods 200 (FIG. 2) and/or 300 (FIG. 3A). The path security attributes may be indicated as transitive attributes in the BGP messages. In this manner, though routers 702, 703, 704, 705, 706, 707, 709, 710, 712, and 713 may not apply security should any of those routers advertise paths to customer routers 708 and/or 711, the BGP messages advertising those routes may include the path security attributes advertised by customer routers 708 and/or 711 themselves.

The customer router 711 may be the origin for the route prefix "10.0.0.0/24". However, the malicious router 710 may also advertise itself as the origin of the route prefix "10.0.0.0/24". As such, each router 702, 703, 704, 705, 706, 707, 708, 709, 712, and 713 may include two paths associated with the route prefix "10.0.0.0/24", one a "good" path toward customer router 711 and one a "bad" path toward malicious router 710. For example, transit router 703 may include a path C to the malicious router 710 for route prefix "10.0.0.0/24" that proceeds through ISP router 706 to malicious router 710. As such, path C may have a path length that is two hops. Transit router 703 may include a path D to the customer router 711 for route prefix "10.0.0.0/24" that proceeds through ISP router 705, to customer router 708, and on to customer router 711. As such, path D may have a path length that is three hops.

Regardless of whether the routers 702, 703, 704, 705, 706, 707, 708, 709, 711, 712, and 713 apply or do not apply security themselves, the routers 702, 703, 704, 705, 706, 707, 708, 709, 711, 712, and 713 may be configured to select a secure BGP path according to various embodiments. In various embodiments, the routers 702, 703, 704, 705, 706, 707, 708, 709, 711, 712, and 713 may be configured to perform operations of method 350 (FIG. 3B) to select a secure BGP path. Whether or not routers 706, 707, and 713 are configured to select a secure BGP path according to various embodiments, as malicious router 710 is only a single hop from those routers 706, 707, and 713, packets from those routers may still be routed to the malicious router 710 because even the modified path length to the malicious router 710 may be less than the modified path length to customer router 711. However, routers father from the malicious router 710 may benefit from the modified path length resulting in mitigating malicious router 710's BGP attack. As a specific example, in response to receiving a packet for routing to route prefix "10.0.0.0/24", transit router 703 may perform operations of method 350 (FIG. 3A) to select between path C and path D.

Figure 8:
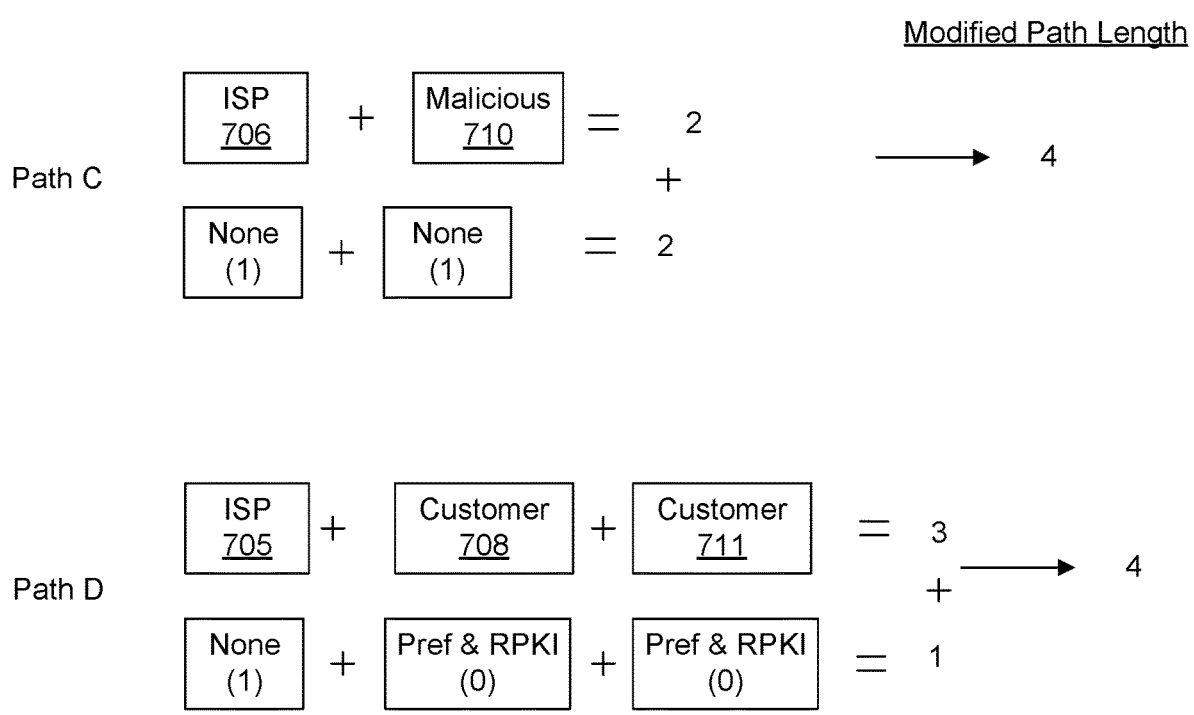
FIG. 8 is a block diagram comparing modified path lengths between paths of the IP network of FIG. 7.

In an embodiment, the transit router 703 may modify the path lengths of the routes C and D based on their respective path security attributes and may select the shortest path based on the modified path lengths. For example, FIG. 8 illustrates modified path lengths between paths of the IP network 700 according to an embodiment. With reference to FIGS. 1-8, path C may include two hops from the transit router 703, i.e., a hop to ISP router 706 and a hop to malicious router 710. There may be no applied or indicated security along path C which may result in a security cost of 1 for both ISP router 706 and malicious router 710 for a total security cost along path C of 2. The total security cost along path C and the path length for path C may be added together to arrive at the modified path length of 4. In a similar manner, path D may include three hops from transit router 703, i.e., a hop to ISP router 705, a hop to customer router 708, and a hop to customer router 711. The security along path D may include no security applied or indicated by ISP router 705 which may result in a security cost of 1, prefix filtering and RPKI applied by customer router 708 which may result in a security cost of 0, and prefix filtering and RPKI applied by customer router 711 which may result in a security cost of 0 for a total security cost along path D of 4. The total security cost along path D and the path length for path D may be added together to arrive at the modified path length of 4. As path C's modified path length of 4 may be the same as the modified path length of path D, the transit router 703 may treat the modified path lengths as a tie and apply a tie breaker condition. In this manner, though the actual path length for path C is shorter than path D, path C may not be favored over path D because the modified path lengths may be the same. This effective de-prioritization of path C may serve to mitigate the impact of the BGP attack by malicious router 710. In some embodiments, the tie breaker condition may be to choose the path along which security is applied and/or along which the greater amount of security is applied. In this manner, though the modified path lengths for path C and path D are the same, i.e., 4, the more secure path, path D, may be prioritized over the less secure path, path C, in route selections by transit router 703.

Figure 9:
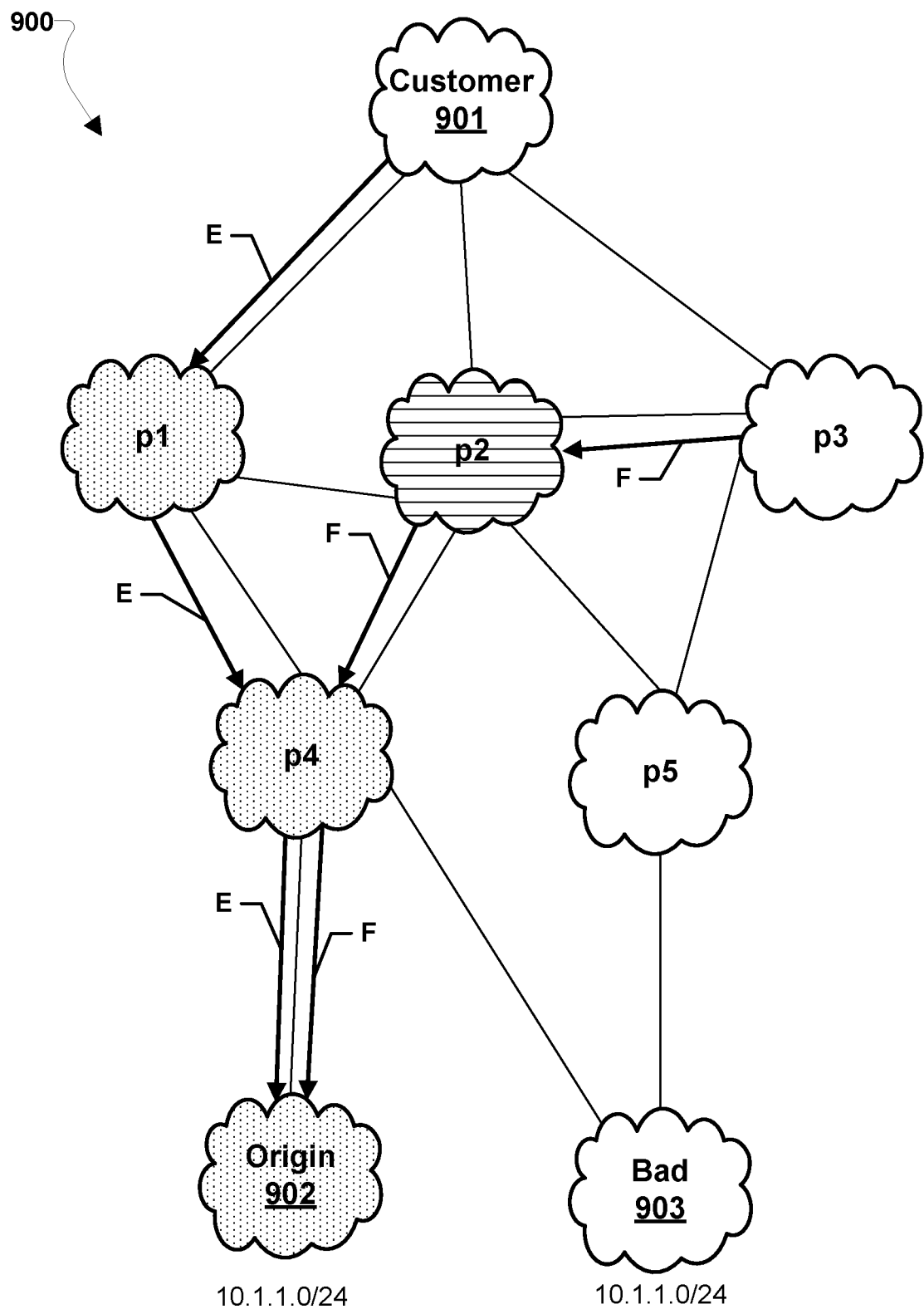
FIG. 9 is a communication system block diagram illustrating selection of secure BGP paths in an IP network according to an embodiment.

FIG. 9 is a communication system block diagram illustrating selection of secure BGP paths in an IP network 900 according to an embodiment. With reference to FIGS. 1-9, the IP network 900 may include different ASs, such as customer router 901, router p1, router p2, router p3, router p4, router p5, origin router 902, and bad router 903. In the network 900, routers p1, p4, and origin router 902 may apply sufficient security to have security costs of zero according to various embodiments. Router p2 may apply partial security such that router p2 has a security cost below the default security cost. Routers p3, p5, and the customer router 901 may not apply security and/or do not report their security types. In network 900, origin router 902 may be an AS actually associated with the route prefix "10.1.1.0/24" and bad router 903 may be a malicious AS performing a BGP attack to cause packets to be mis-routed to it for the route prefix "10.1.1.0/24." In various embodiments, origin router 902, router p4, router p1, and router p2 may be configured to report their security setting using path security attributes in BGP messages, for example by performing operations of methods 200 (FIG. 2) and/or 300 (FIG. 3A). The path security attributes may be indicated as transitive attributes in the BGP messages. In this manner, though not every computing device reporting a path through, or to, origin router 902, router p4, router p1, and/or router p2 may not apply security, should any of those computing devices advertise paths through, or to, origin router 902, router p4, router p1, and/or router p2, the BGP messages advertising those routes may include the path security attributes advertised by origin router 902, router p4, router p1, and/or router p2 themselves.

Regardless of whether customer router 901 applies or does not apply security itself, the customer router 901 may be configured to select a secure BGP path according to various embodiments. In various embodiments, the customer router 901 may be configured to perform operations of method 350 (FIG. 3B) to select a secure BGP path. As a specific example, in response to receiving a packet for routing to route prefix "10.1.1.0/24", customer router 901 may perform operations of method 350 (FIG. 3A) to select path E from router p1, through router p4, to origin router 902 because that secure path E may have the lowest modified prefix length when security costs of the possible paths are accounted for. Additionally, regardless of whether router p3 applies or does not apply security itself, the router p3 may be configured to select a secure BGP path according to various embodiments. In various embodiments, the router p3 may be configured to perform operations of method 350 (FIG. 3B) to select a secure BGP path. As a specific example, in response to receiving a packet for routing to route prefix "10.1.1.0/24", router p3 may perform operations of method 350 (FIG. 3A) to select path F from router p2, through router p4, to origin router 902 because that secure path F may have the lowest modified prefix length when security costs of the possible paths are accounted for. As such, the transitive nature of the path security attributes may enable origin router 902 to mitigate the BGP attack by bad router 903 because all but the closets routers in the network (i.e., router p5) may select secure paths toward origin router 902 rather than bad router 903 for route prefix "10.1.1.0/24".

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 200, 300, and 350 may be substituted for or combined with one or more operations of the methods 200, 300, and 350, and vice versa.

Figure 10:
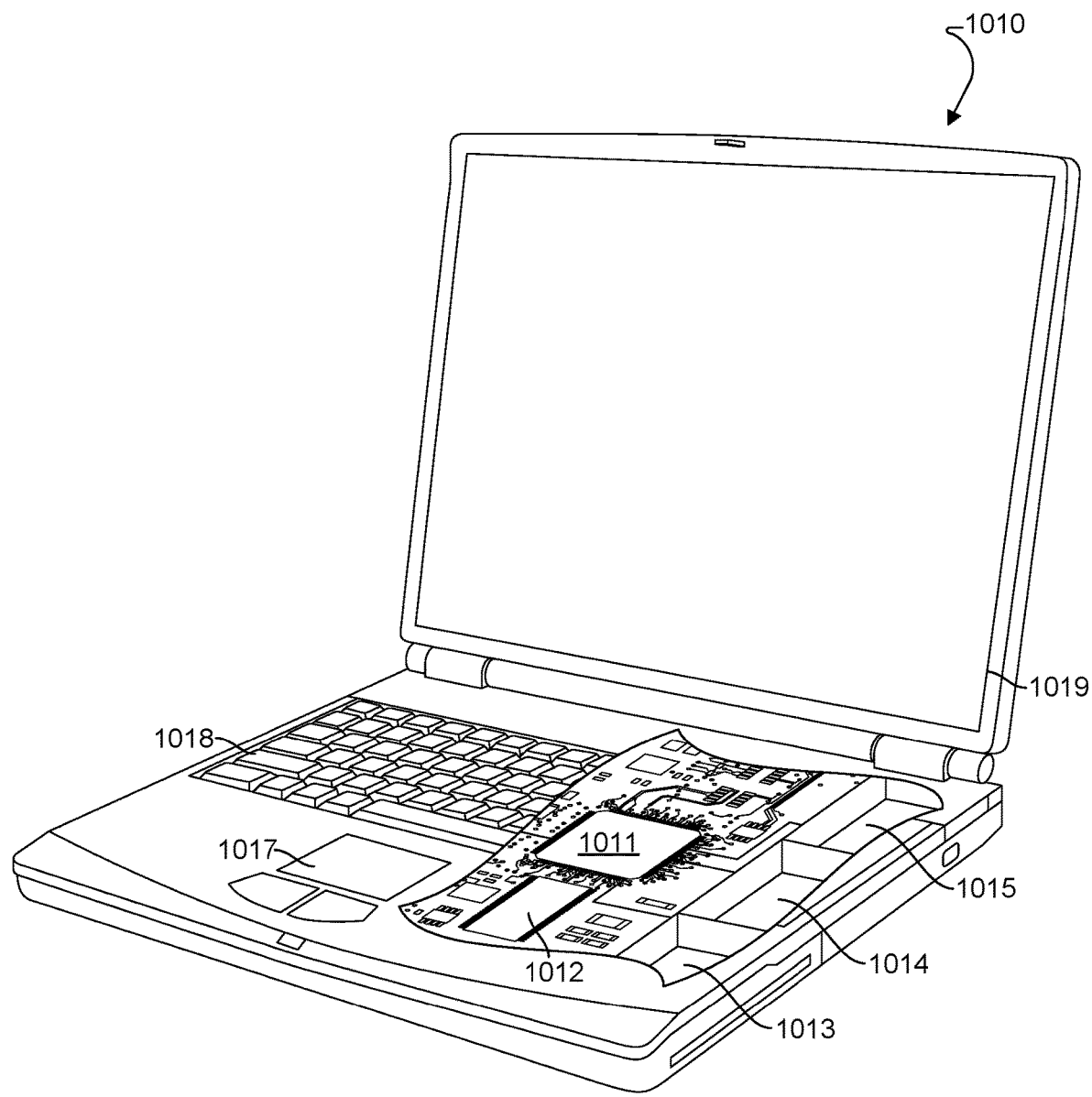
FIG. 10 is a component block diagram of an example computing device suitable for use with the various embodiments.

FIG. 10 is a component diagram of an example computing device suitable for use with various embodiments. The various embodiments (including, but not limited to, embodiments discussed above with reference to FIGS. 1-9) described above may also be implemented within a variety of computing devices, such as a laptop computer 1010 as illustrated in FIG. 10. Many laptop computers include a touch pad touch surface 1017 that serves as the computer's pointing device, and thus may receive drag, scroll, and flick gestures similar to those implemented on mobile computing devices equipped with a touch screen display and described above. A laptop computer 1010 will typically include a processor 1011 coupled to volatile memory 1012 and a large capacity nonvolatile memory, such as a disk drive 1013 of Flash memory. The laptop computer 1010 may also include a floppy disc drive 1014 and a compact disc (CD) drive 1015 coupled to the processor 1011. The laptop computer 1010 may also include a number of connector ports coupled to the processor 1011 for establishing data connections or receiving external memory devices, such as a USB or FireWire® connector sockets, or other network connection circuits (e.g., interfaces) for coupling the processor 1011 to a network. In a notebook configuration, the computer housing may include the touchpad 1017, the keyboard 1018, and the display 1019 all coupled to the processor 1011. Other configurations of the computing device may include a computer mouse or trackball coupled to the processor (e.g., via a USB input) as are well known, which may also be used in conjunction with the various embodiments.

Figure 11:
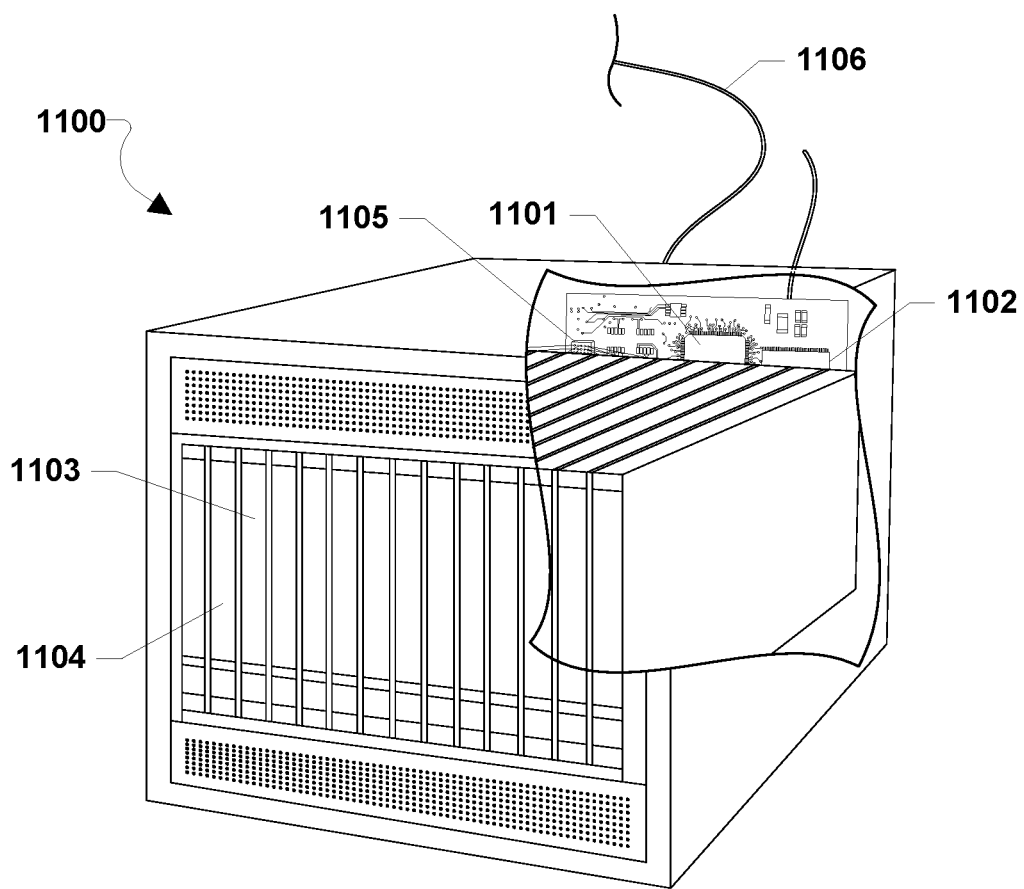
FIG. 11 is a component diagram of an example server suitable for use with the various embodiments.

Various embodiments (including, but not limited to, embodiments discussed above with reference to FIGS. 1-9) may be implemented on any of a variety of commercially available server devices, such as the server device 1100 illustrated in FIG. 11. Such a server device 1100 may include a processor 1101 coupled to volatile memory 1102 and a large capacity nonvolatile memory, such as a disk drive 1103. The server device 1100 may also include a floppy disc drive, compact disc (CD) or DVD disc drive 1104 coupled to the processor 1101. The server device 1100 may also include network access ports 1106 coupled to the processor 1101 for establishing data connections with a network connection circuit 1105 and a communication network (e.g., IP network) coupled to other communication system network elements.

Figure 12:
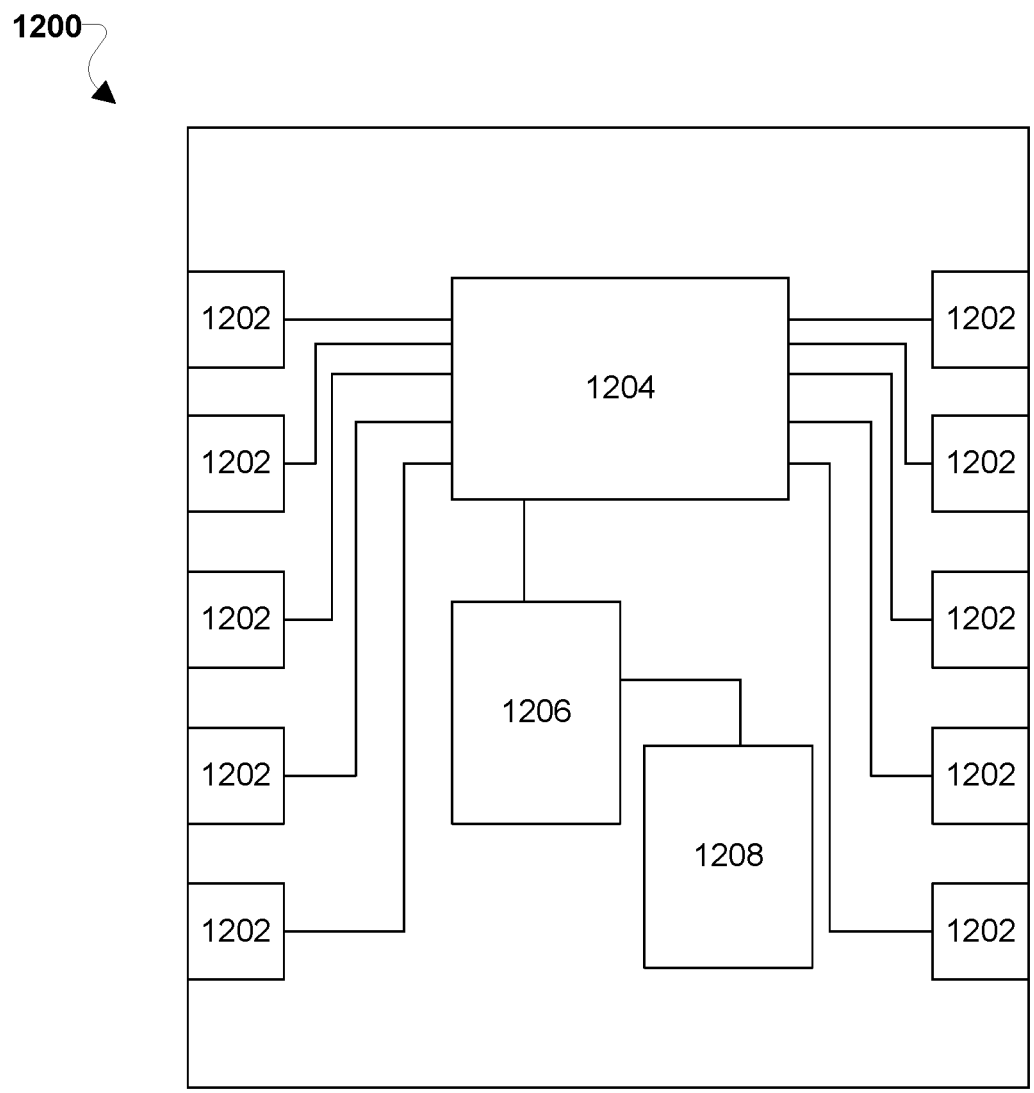
FIG. 12 is a component diagram of an example router suitable for use with the various embodiments.

Various embodiments (including, but not limited to, embodiments discussed above with reference to FIGS. 1-9) may be implemented on any of a variety of commercially available router devices, such as the router 1200 illustrated in FIG. 12. Such a router 1200 may include a processor 1206 coupled to one or more memories 1208. The router 1200 may include a series of network access ports 1202 coupled to switching circuitry controlled by the processor 1206. The network access ports 1202 may establish data connections one or more communication networks (e.g., IP networks) coupled to other communication system network elements. The switching circuitry 1204 may be controlled by processor 1206 to route packets from one or more network access ports 1202 to one or more other network access ports 1202 to thereby interconnect one or more communication network and communications system network elements.

The processors 1011, 1101, 1206 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 1011, 1101, 1206. The processors 1011, 1101, 1206 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 1011, 1101, 1206 including internal memory or removable memory plugged into the device and memory within the processors 1011, 1101, 1206 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of selecting a secure Border Gateway Protocol (BGP) path, comprising:
   receiving, at a computing device, a packet for routing to a route prefix;
   determining, by the computing device, any available paths to the route prefix and path lengths for the available paths, wherein the path length for each respective available path corresponds to a hop count to the route prefix for that respective available path;
   determining, by the computing device, a security cost for each available path based at least in part on any path security attributes associated with that respective available path;
   modifying, by the computing device, path lengths for the available paths according to their respective security costs by adding the security cost to the hop count for each respective available path;
   selecting, by the computing device, a path for routing the packet from the available paths based at least in part on the modified path lengths; and
   routing, by the computing device, the packet to the route prefix along the selected path.

2. The method of claim 1, wherein the security costs are values ranging from zero to one.

3. The method of claim 1, wherein the path security attributes are attributes indicated in BGP update messages received for the available paths.

4. The method of claim 3, wherein the path security attributes indicate one or more types of security applied by autonomous systems in the available paths.

5. The method of claim 1, wherein selecting the path for routing the packet from the available paths based at least in part on the modified path lengths comprises using the path security attributes as a tie breaker between paths having matching modified path lengths.

6. A method for advertising a secure Border Gateway Protocol (BGP) path, comprising:
   receiving, at a computing device, an indication of a route prefix to advertise;
   determining, by the computing device, one or more current security settings, wherein the determined one or more current security settings are one or more types of security applied by the computing device to packets routed by the computing device;
   generating, by the computing device, a BGP message including indications of the determined one or more current security settings as one or more path security attributes; and
   sending, by the computing device, the BGP message including the one or more path security attributes.

7. The method of claim 6, wherein the one or more path security attributes are indicated as bit values in the BGP message.

8. The method of claim 6, wherein the one or more path security attributes are indicated as transitive attributes in the BGP message.

9. A device, comprising:
   a processor configured with processor-executable instructions to perform operations comprising:
      receiving a packet for routing to a route prefix;
      determining any available paths to the route prefix and path lengths for the available paths, wherein the path length for each respective available path corresponds to a hop count to the route prefix for that respective available path;
      determining a security cost for each available path based at least in part on any path security attributes associated with that respective available path;
      modifying path lengths for the available paths according to their respective security costs by adding the security cost to the hop count for each respective available path;
      selecting a path for routing the packet from the available paths based at least in part on the modified path lengths; and
      routing the packet to the route prefix along the selected path.

10. The device of claim 9, wherein the processor is configured with processor-executable instructions to perform operations such that the security costs are values ranging from zero to one.

11. The device of claim 9, wherein the processor is configured with processor-executable instructions to perform operations such that the path security attributes are attributes indicated in Border Gateway Protocol (BGP) update messages received for the available paths.

12. The device of claim 11, wherein the processor is configured with processor-executable instructions to perform operations such that the path security attributes indicate one or more types of security applied by autonomous systems in the available paths.

13. The device of claim 9, wherein the processor is configured with processor-executable instructions to perform operations such that selecting the path for routing the packet from the available paths based at least in part on the modified path lengths comprises using the path security attributes as a tie breaker between paths having matching modified path lengths.

14. A device, comprising:
   a processor configured with processor-executable instructions to perform operations comprising:
      receiving an indication of a route prefix to advertise;
      determining one or more current security settings, wherein the determined one or more current security settings are one or more types of security applied by the device to packets routed by the device;
      generating a Border Gateway Protocol (BGP) message including indications of the determined one or more current security settings as one or more path security attributes; and
      sending the BGP message including the one or more path security attributes.

15. The device of claim 14, wherein the processor is configured with processor-executable instructions to perform operations such that the one or more path security attributes are indicated as bit values in the BGP message.

16. The device of claim 14, wherein the processor is configured with processor-executable instructions to perform operations such that the one or more path security attributes are indicated as transitive attributes in the BGP message.

17. A non-transitory processor-readable storage medium having stored thereon processor-executable instructions configured to cause a processor to perform operations, comprising:
   receiving a packet for routing to a route prefix;

determining any available paths to the route prefix and path lengths for the available paths, wherein the path length for each respective available path corresponds to a hop count to the route prefix for that respective available path;

determining a security cost for each available path based at least in part on any path security attributes associated with that respective available path;

modifying path lengths for the available paths according to their respective security costs by adding the security cost to the hop count for each respective available path;

selecting a path for routing the packet from the available paths based at least in part on the modified path lengths; and routing the packet to the route prefix along the selected path.

18. The non-transitory processor-readable storage medium of claim 17, wherein the stored processor-executable instructions are configured to cause a processor to perform operations such that the security costs are values ranging from zero to one.

19. The non-transitory processor-readable storage medium of claim 17, wherein the stored processor-executable instructions are configured to cause a processor to perform operations such that the path security attributes are attributes indicated in Border Gateway Protocol (BGP) update messages received for the available paths.

20. The non-transitory processor-readable storage medium of claim 19, wherein the stored processor-executable instructions are configured to cause a processor to perform operations such that the path security attributes indicate one or more types of security applied by autonomous systems in the available paths.

21. The non-transitory processor-readable storage medium of claim 17, wherein the stored processor-executable instructions are configured to cause a processor to perform operations such that selecting the path for routing the packet from the available paths based at least in part on the modified path lengths comprises using the path security attributes as a tie breaker between paths having matching modified path lengths.

22. A non-transitory processor-readable storage medium having stored thereon processor-executable instructions configured to cause a processor to perform operations, comprising:

receiving an indication of a route prefix to advertise;

determining one or more current security settings, wherein the determined one or more current security settings are one or more types of security applied by a device to packets routed by the device;

generating a Border Gateway Protocol (BGP) message including indications of the determined one or more current security settings as one or more path security attributes; and sending the BGP message including the one or more path security attributes.

23. The non-transitory processor-readable storage medium of claim 22, wherein the stored processor-executable instructions are configured to cause a processor to perform operations such that the one or more path security attributes are indicated as bit values in the BGP message.

24. The non-transitory processor-readable storage medium of claim 22, wherein the stored processor-executable instructions are configured to cause a processor to perform operations such that the one or more path security attributes are indicated as transitive attributes in the BGP message.

* * * * *